(12) United States Patent
Wiesenberg

(10) Patent No.: US 10,260,278 B1
(45) Date of Patent: Apr. 16, 2019

(54) VIEWING ASSEMBLY FOR DOOR

(71) Applicant: Jack Roy Wiesenberg, Aventura, FL (US)

(72) Inventor: Jack Roy Wiesenberg, Aventura, FL (US)

( * ) Notice: Subject to any disclaimer, the term of this patent is extended or adjusted under 35 U.S.C. 154(b) by 38 days.

(21) Appl. No.: 15/098,767

(22) Filed: Apr. 14, 2016

(51) Int. Cl.
*E06B 7/30* (2006.01)
*G02B 7/182* (2006.01)

(52) U.S. Cl.
CPC .............. *E06B 7/30* (2013.01); *G02B 7/182* (2013.01)

(58) Field of Classification Search
CPC ............ G02B 25/04; G02B 7/182; E06B 7/30
See application file for complete search history.

(56) References Cited

U.S. PATENT DOCUMENTS

| | | | |
|---|---|---|---|
| 3,931,425 A | | 1/1976 | Kuroda |
| 4,175,824 A | * | 11/1979 | Daley .................... G02B 25/04 359/504 |
| 4,561,116 A | * | 12/1985 | Neyret ..................... E06B 7/30 220/663 |
| 5,262,901 A | * | 11/1993 | Degnan .................. G02B 25/04 359/503 |
| 6,357,103 B1 | | 3/2002 | Sikorski |
| 6,607,283 B1 | * | 8/2003 | Cozad ....................... E06B 7/30 362/100 |
| 6,824,868 B2 | | 11/2004 | Bell et al. |
| 8,007,896 B2 | | 8/2011 | Hicks et al. |
| 9,855,731 B2 | | 1/2018 | Sutton et al. |
| 2003/0204997 A1 | * | 11/2003 | Harter ...................... E06B 7/30 49/171 |
| 2006/0078716 A1 | | 4/2006 | Yacovone |
| 2007/0275167 A1 | | 11/2007 | Hicks et al. |
| 2010/0110519 A1 | * | 5/2010 | Nerden .................... E06B 7/30 359/233 |

* cited by examiner

*Primary Examiner* — Kimberly N. Kakalec
(74) *Attorney, Agent, or Firm* — Malloy & Malloy, PL

(57) ABSTRACT

A viewing assembly specifically, but not exclusively, structured for viewing through a solid, glass or transparent material panel includes a housing and an outer section collectively disposed in an operative position, respectively on and inner and outer surfaces of the panel. Inner and outer ends of the housing respectively include aligned first and second viewing apertures. A viewing member, structured for restricted, unidirectional viewing there through, is disposed within the housing in aligned relation to the first and second viewing apertures, and may be in the form of a one way mirror. The outer section is disposed in visually covering relation to the inner end of the housing and includes a third viewing aperture, wherein the first, second and third viewing apertures and the viewing member are collectively disposed in visually aligned relation along a predetermined line-of-sight extending through the panel from an interior to an exterior thereof.

26 Claims, 6 Drawing Sheets

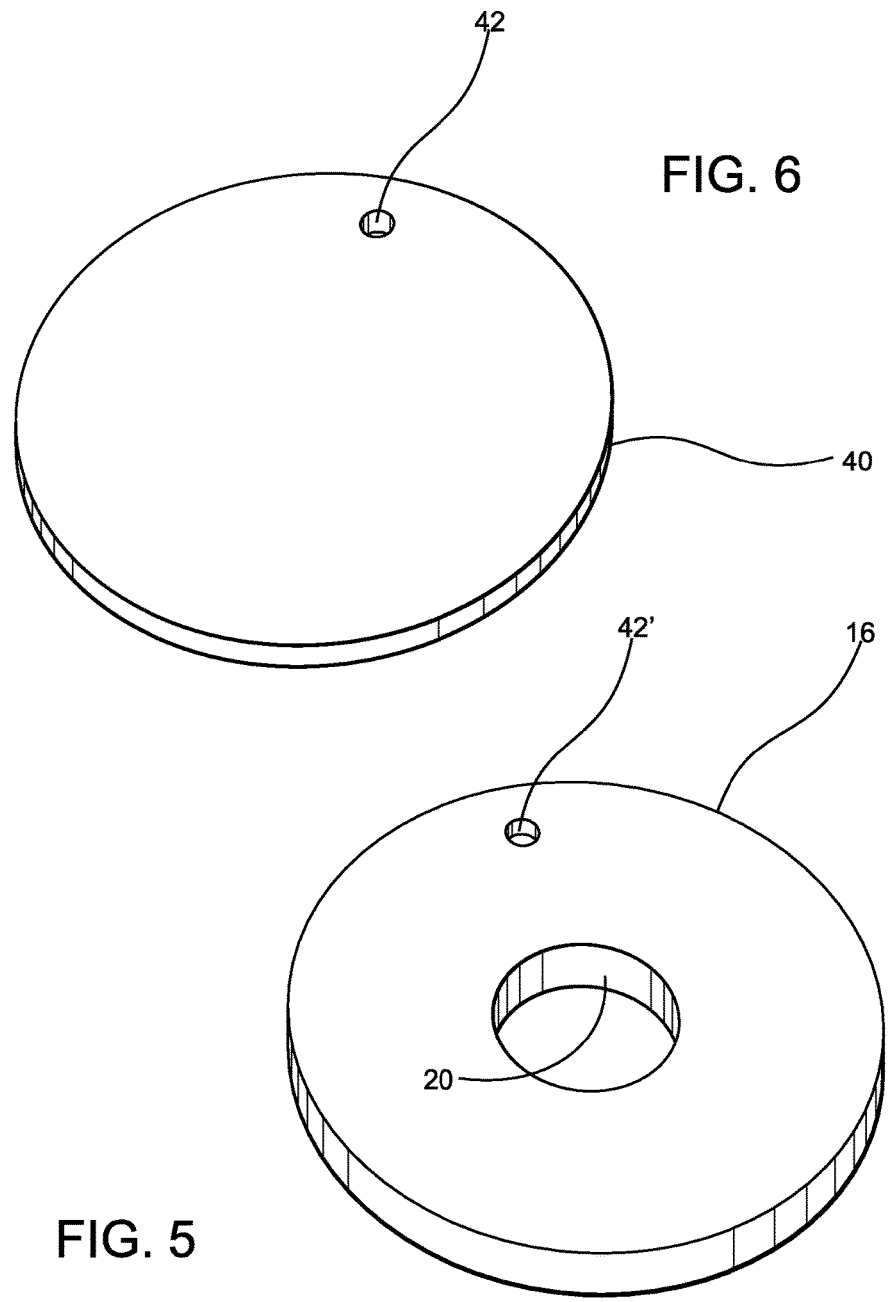

VIEWING ASSEMBLY FOR DOOR

BACKGROUND OF THE INVENTION

Field of the Invention

This invention is directed to a viewing assembly structured for use on a glass or other transparent material door or panel structure which facilitates one-way, restricted viewing there through. A housing and outer section are respectively and operatively positioned on inner and outer surfaces of the door in a manner which utilizes a solid material viewing channel integrated into the door or panel and eliminates the need for forming an apertured viewing channel through the door or panel.

Description of the Related Art

Many homeowners and other individuals involved in commercial property such as hotels, apartments, condominiums, etc. use door viewing devices to enhance security. Such viewing devices may of course vary in appearance, function, operation and utility. By way of example only, for purposes of aesthetics the portion of the viewing device observable from an exterior of the door may include numerous decorative features or may be structured to have multiple functions or purposes, such as a door knocker, illumination assembly, address plate, etc. Frequently, such included aesthetics also serve to at least partially hide or obscure the viewing device while not interfering with its intended viewing function.

Door viewing devices, also commonly known as eye holes and "peepholes" are security devices that permit a viewer located on the interior of a room and a corresponding side of a door, to observe individuals or objects located on the outside of the corresponding door. As known and commercially available door viewing devices of this type typically include some type of "viewing plug" or similar device, which is inserted within an opening, hole, aperture, etc. of the door. As such, the viewing plug inserted into the formed door aperture facilitates viewing, through the door to the exterior thereof. Due to the widespread use of such door viewing devices, the inserted viewing plug frequently includes a lens, or other viewing structure that allows an individual to better observe the area on the exterior of the door.

In use, an individual positioned behind an interior side of the door peers through the inserted viewing plug or viewing device, to view at least the immediate area surrounding the exterior of the door. As a result, the identity of individuals, recognition of objects, etc. can be readily determined. However, conventional door viewing devices of the type described suffer from several disadvantages which include, but are not limited to, "two-way viewing".

More specifically, many if not most of conventional viewing devices in use allow an individual, located on the exterior of the door in which the viewing device is mounted, to observe whether or not an interior individual is utilizing the viewing device. This is typically evidenced by a change in light observable through the viewing plug or like structure, by the exterior individual. By noticing the changes in light issuing from the viewing device the outside viewer is alerted to the fact that someone is located within the interior of the room, on the opposite side of the door. As a result, the security of the interior individual may be compromised.

As indicated above, the security aspects of viewing devices of the type described must take into account that the observer should be provided with a maximum viewing area, while visual observation or determination of the position of the interior individual should be eliminated or significantly restricted. Such requirements, while not commonly available with many of the known and or commercially available viewing devices increase the security aspects as the interior observer can easily identify the exterior visitor without providing the visitor with any visual information or awareness.

As represented in the prior art structures of FIGS. 1 and 2, structural and operative features of a conventional wooden or other solid, opaque material door 100, which include a conventional viewing device or "peephole", 103 frequently necessitate the formation of an aperture or opening 102. As represented in FIG. 2, the aperture or opening 102 is formed within the door, panel or like structure 100 and extends there through. As also represented, the aperture 102 includes at least a portion of a conventional viewing device 103. More specifically, a "viewing plug" 104 is structured to facilitate viewing of the exterior of the door 100 and is cooperatively dimensioned and configured there with to be inserted within the formed aperture or opening 102. As is also well known such viewing devices 103 are most prominently used with doors, panel structures, etc. which are formed from a wood, metal or other at least partially opaque material. As such, viewing through such solid, opaque material is normally not possible. Therefore, the use of the viewing device 103 including the viewing plug 104 inserted within the viewing aperture 102 is required. Accordingly, exterior viewing through the solid, opaque material door 100, utilizing the viewing device 103, requires the use of a "viewing channel" in the form of an opening, hole, etc. 102 in which the viewing plug 104 is inserted.

However, modern day architecture and design utilize the use of glass or other transparent material doors, panels and other structures, to a much greater extent. Normally, glass doors, panels and like structures which may define an entrance to a given area may be left partially or entirely transparent. It should be recognized that at least some of the disadvantages as set forth above such as, but not limited to, "two-way" viewing or observation through transparent doors or panel structures is not always desirable. Individuals on the interior of a glass door or panel structure may want to avoid observation of interior areas for reasons relating to security, modesty, privacy or individual preference. In order to overcome such problems, the door, entrance panel, etc. may be structured or modified, at least to the extent of restricting a clear two-way viewing there through. In situations such as this, viewing devices specifically adapted for use with the glass or other transparent material doors would be highly desirable.

However, glass or many other transparent material doors, panels, entrance structures, etc. do not lend themselves to the formation of a hole or apertured viewing channel therein. Accordingly, it is not practical and is at least problematic to insert or otherwise position a conventional "viewing plug" 104 within an apertured viewing channel 102 and through the interior of glass or other transparent material doors, as in the manner at least generally represented in the prior art structure of FIG. 2.

Accordingly, it would be desirable to provide a viewing assembly which provides secure observation through a glass and/or transparent material door, entrance way, etc. in a manner which eliminates the need and related difficulties in forming a hole or aperture in which a conventional or customized "viewing plug" is inserted. In addition, such an improved and proposed viewing device could be designed and structured in a simple, cost-effective manner which is limited in operative components and complexity's, has a compact design and can easily be mounted in an operative position relating to a clear and/or transparent solid portion of a glass door. Further, such a preferred and improved viewing assembly would include sufficient security features to prevent "two-way viewing" as generally set forth above.

SUMMARY OF THE INVENTION

The present invention is directed to a viewing assembly of the type more commonly referred to as an eyehole or "peephole". However, the viewing assembly of the present invention is clearly distinguishable from known and/or conventional eyeholes, peepholes, etc. by being structurally adapted and operative for use with a glass or other transparent material door, panel etc. In more specific terms and as described in greater detail herein, a viewing assembly of the present invention facilitates the viewing through a solid, transparent material "viewing channel". With reference to the prior art representations of FIGS. 1 and 2, conventional peepholes and like viewing structures are commonly used with a wooden or other solid, opaque material door. As applied, a viewing plug or like device or structure 104, is inserted into a hole, aperture, opening, etc. formed in the door or panel 100 and commonly extends completely there through. Once inserted, the viewing plug 104 facilitates viewing there through, at least from an interior to an exterior of the door 100.

In contrast, glass doors or like solid, transparent material panels present problems relating to the formation of a hole, aperture or like apertured viewing channel there through. Therefore, the improved viewing assembly of the present invention is operatively and structurally adapted to be utilized with a solid transparent material "viewing channel" defined as an integral part of the door. Further, the solid, transparent material viewing channel should be disposed and structured to facilitate an interior individual's viewing of an exterior area of the glass door or like transparent material panel. Therefore, the necessity of forming a hole, aperture, etc. in a glass or like transparent material door or panel is eliminated, which in turn overcomes at least some of the problems and disadvantages recognized with conventional viewing devices, as at least generally set forth above.

Accordingly, the proposed and improved viewing assembly of the present invention comprises a housing having an inner end and an outer end. When in an operative position, the inner end of the housing is adhered to or otherwise mounted on an interior surface of the glass door or panel with which it is utilized. The housing also includes an outer end disposed in spaced relation to the inner end. Moreover, the outer end may project at least partially, outwardly from the interior surface of the glass door, in a position and orientation which facilitates viewing by an interior individual there through. The inner end of the housing includes a first viewing aperture and the outer end includes a second viewing aperture. Both the first and second viewing apertures are disposed in visual alignment with one another and with the solid, transparent material viewing channel integrally formed in the glass or like transparent material door or panel.

In addition, the viewing assembly of the present invention includes a viewing component or member disposed within an at least partially hollow interior of the housing. The viewing member is formed of a material which facilitates at least partially restricted viewing there through. Moreover, the viewing member is disposed contiguous or adjacent to the interior of the inner end of the housing as well as adjacent to the corresponding end of the transparent, solid material viewing channel. Further, the viewing member is operatively disposed in visually aligned relation with the first and second viewing apertures as well as the solid material viewing channel. The viewing member may be in the form of a lens or be otherwise structured to enhance the area being observed on the exterior of the glass or like material door so as to increase the observation area of the interior viewing individual.

As set forth above, the viewing member may also be structured to include "restricted viewing" capabilities. This feature overcomes known and recognized problems with conventional viewing devices or peepholes by preventing "two-way" viewing through the viewing assembly and/or housing. As a result, an exterior visitor will not be able to determine if the viewing assembly of the present invention is being utilized by an interior individual. Therefore, in at least one embodiment the restricted viewing capabilities include a one way mirror. The one way mirror component and the remainder of the viewing member are oriented to facilitate viewing from an interior to an exterior of the solid material viewing channel and corresponding glass door or similar material panel. However, when the housing is in the operative position, the viewing member is oriented to prevent viewing in the opposite direction into the interior of the door panel by virtue of the one way mirror or other restrictive viewing structure associated with the viewing member.

In one or more additional preferred embodiments of the present invention, the viewing assembly comprises an outer section. The outer section is adhered or otherwise appropriately mounted on the exterior surface of the glass or like material door or panel in aligned relation with the housing and preferably in visually covering relation to at least the inner end thereof. When utilized in combination with the housing, the outer section includes a third viewing aperture. As such the first, second and third viewing apertures, as well as the viewing member, are all disposed in visually aligned relation with one another and with the solid material viewing channel. As a result, a line-of-sight is established and/or defined from an interior side or area of the glass or similar transparent material door or panel to an exterior thereof, through the housing and.

It is noted that at least one preferred embodiment of the viewing assembly includes the housing and its components, as well as the outer section, used in combination with one another in an operative position, as described herein. However, the viewing assembly of the present invention may be utilized with the housing being disposed in an operative position independent of the positioning and utilization of the outer section. Accordingly, when the housing is used by itself, absent the outer section, the aforementioned line-of-sight may be at least partially defined by the first and second viewing apertures and the viewing member being disposed in visual alignment with one another and in visual alignment with the solid material viewing channel integrated into the transparent material door or panel structure.

As emphasized in detail herein, utilization of the various preferred embodiments of the viewing assembly of the present invention is accomplished by virtue of the existence of a transparent, solid material "viewing channel" integrally formed as a part of the glass or other transparent material door, panel, etc., on which the viewing assembly is mounted. As should be apparent due to the fact that the glass door or panel is formed of a transparent material and the solid material viewing channel is an integrated part of that door or panel, clear viewing through the solid, transparent material viewing channel is facilitated.

However, the present invention also contemplates treatment, processing or structuring of the panel or door to include at least one obstructed surface. As a result, an "obstructed viewing" through remaining portions of the glass or other transparent material door is established and maintained. Such obstructed viewing provides for increased security and privacy of individuals located on the interior side of the transparent door or panel. However, such a preferred treatment, processing, structuring, etc. is accomplished in a manner which is distinguishable from the prior art at least by maintaining a clear, transparent, see-through portion of the glass door or panel structure, which is described herein as the aforementioned solid but transparent material "viewing channel".

Therefore, in one additional embodiment of the present invention, at least one surface of the glass or other material door or panel includes at least one laminate having at least one but it in certain practical applications a plurality of "layers". As such, each of the one or more layers include and may be defined by printing, preferably digital printing, in the form of printed decorations, coloring, indicia or a combination thereof. Also, the utilization of at least one, but in additional embodiments multiple or a plurality of "printed layers" on the laminate may serve to provide a textured surface of the glass or other transparent material door or panel. In more specific terms, when multiple printed layers are formed on the laminate the aforementioned textured surface may be accomplished by forming the printed layers successively, on top of one another. This textured surface and/or multiple, successively printed, overlying layers will further enhance the attractive, decorative features of the door panel and may also provide additional obstructed viewing features thereof. Therefore, as used herein the term "obstructed viewing" is meant to include a processing of one or more surfaces of the glass or like material door or panel in a manner which eliminates or significantly restricts visual observation there through specifically, but not exclusively, from an exterior of the door or panel to the interior thereof. Further, such obstructed viewing may include sufficient treatment or processing of the single or multiple printed layer laminate to render one or more of the surfaces opaque, thereby completely preventing viewing there through. In the alternative, the one or more laminates may be treated, processed, etc. to provide a translucent, as versus a transparent, quality to the glass or like transparent material door, panel, etc. Further, such processing done to provide an obstructed viewing through the door, panel, etc. is specifically absent in the area of the solid, transparent material viewing channel.

It is also emphasized that one or more embodiments of the present invention include the "obstructed viewing" being defined by a single laminate having at least one but possibly multiple printed layers applied to at least one surface thereof. However, in the alternative a plurality of individual laminates may be disposed in at least partially overlying relation to one another to form the textured and/or translucent and/or substantially opaque "obstructed viewing" through the glass or other transparent material door or panel structure, except in the area of the solid, transparent material viewing channel.

Accordingly, the one or more preferred embodiments of the present invention overcomes many of the disadvantages and problems associated with viewing devices known in the prior art as well as facilitating the ability to use an effective and efficient viewing assembly in combination with a glass or other transparent material door, panel, etc.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 5 is a front perspective view of one component of a housing of the embodiment of the viewing device of the present invention as represented in FIG. 3.

FIG. 6 is a front perspective view of an additional component which may be used in at least one embodiment of the viewing assembly of the present invention.

Like reference numerals refer to like parts throughout the several views of the drawings.

DETAILED DESCRIPTION OF THE PREFERRED EMBODIMENT

Figure 1:
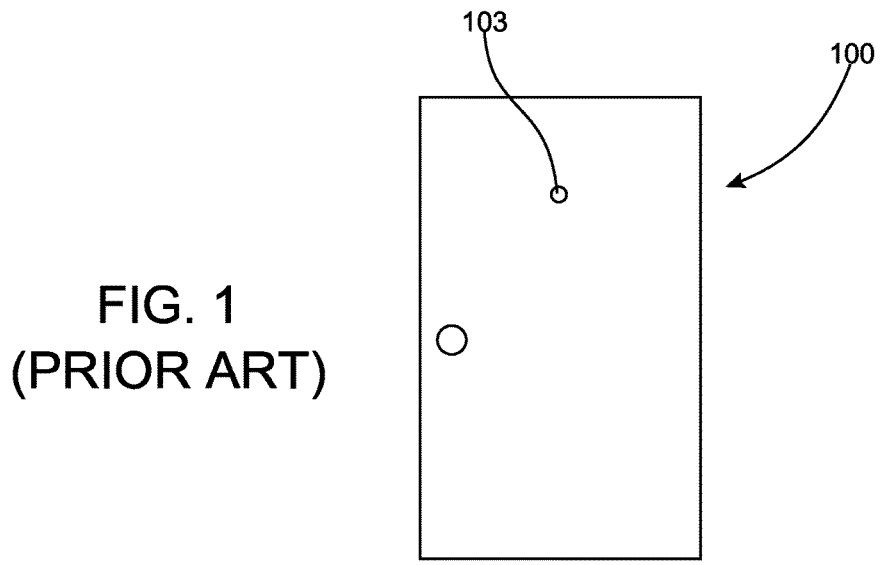
FIG. 1 is a front elevational view of a door having a prior art viewing device formed therein.
Figure 2:
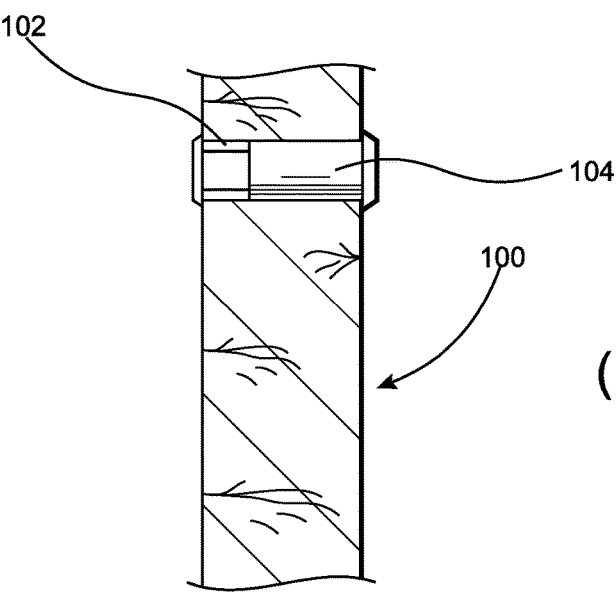
FIG. 2 is a sectional view representing details of the prior art viewing device of FIG. 1.

As represented in the accompanying FIGS. 3-8, the present invention is directed to a viewing assembly generally indicated as 10. Viewing assembly 10 includes a housing 12 having an inner end 14 and an outer end 16, the outer end being represented in FIGS. 3, 5 and is and 7. Further, the outer end 16 may be fixedly and/or removably secured to the housing 12. Moreover, a first viewing aperture 18 is formed in the inner end 14 and a second viewing aperture 20 is formed in the outer end 16.

Figure 3:
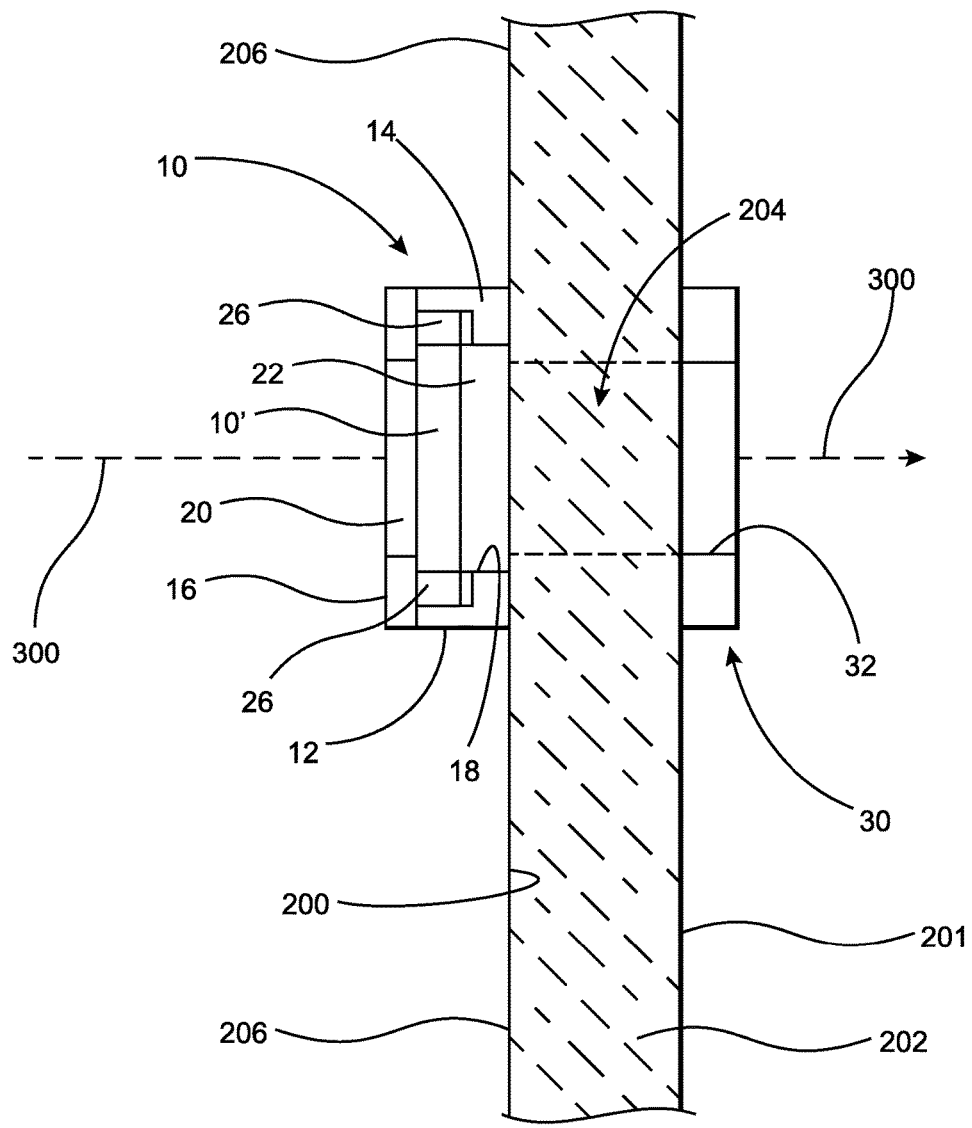
FIG. 3 is a sectional view of the viewing assembly of the present invention in assembled form on a transparent material door or panel.

FIG. 3 represents the viewing assembly 10 being at least partially assembled and the housing 12 being disposed in an operative position adhered to or otherwise mounted on an interior surface 200 of a glass or other transparent material door 202. When so operatively positioned, the interior end 14, as well as the first viewing aperture 18 may be disposed in contiguous and/or adjacent relation to the inner surface 200 of the door 202. For the reasons set forth above, the glass or other solid, transparent material door 202 does not include a hole or aperture viewing channel formed therein. Accordingly the door 202 includes a solid material, transparent viewing channel 204 formed as an integral part thereof. As such, the solid material viewing channel 204 is formed from a transparent portion of the door 202, which is preferably absent any type of obstructed viewing. Further, when in the operative position of FIG. 3, the housing 12 is disposed in aligned relation with the solid viewing channel 204. Moreover, the first and second viewing apertures 18 and 20 respectively are disposed in visually aligned relation with one another and with the solid viewing channel 204, as clearly represented.

The viewing assembly 10 also includes a viewing member 22 formed of a transparent material through which at least "restricted viewing" is facilitated. Also, the viewing member 22 may or may not include magnifying capabilities so as to enhance or enlarge the viewing area which an individual may observe when located on the interior side of the door 202 and while viewing through the viewing assembly 10. As such, the viewing member 22 may or may not be in the form of a magnifying lens or similar structure having magnifying or visually enhancing capabilities. In addition, the aforementioned "restrictive viewing" capability of the viewing member 22 comprises its structuring in a manner which only allows viewing there through in a single direction, such as in the direction of the schematically represented line-of-sight 300.

Accordingly, at least one preferred embodiment the "restricted viewing" of the viewing member 22 may comprise a one way mirror 24. The one way mirror 24 may be formed on one or more surfaces thereof or otherwise incorporated in viewing member 22. The orientation of the viewing member 22 and the one way mirror 24 is such as to allow viewing along the line-of-sight 300 from an interior of the door 202 to an exterior thereof, but prevent viewing in the opposite direction. As a result, enhanced security is provided the utilization of the viewing assembly 10 by preventing an exterior visitor from observing the interior area of the door 202 including, but not limited to, a change in the amount of light passing through the solid transparent material viewing channel 204 from the interior of the door 202.

Also, when the viewing assembly 10 is assembled and the housing 12 is in its operative position, such as represented in FIG. 3, the viewing member 22 is disposed within an at least partially hollow interior 10' of the housing 10. Also, when in the operative position, a retaining member 26 maintains the viewing member in covering and/or inserted relation to the first viewing aperture 18. The retaining member 26 may be a bushing, gasket or other appropriate structure and may be disposed within the hollow interior 10' in retaining engagement or other retaining position relative to the viewing member 22.

Further, when in the operative position, the first and second viewing apertures 18 and 20 and the viewing member 22 are disposed in visually aligned relation with one another and with the solid transparent material viewing channel 204. Further, the first and second viewing apertures 18 and 20 of the housing 10 and the solid, transparent material viewing channel 204 may all be disposed in a visually aligned relation and along and in aligned relation with the line-of-sight 300. Further, in at least one embodiment the dimension, configuration and overall structuring of the inner end 14, outer end 16, respective viewing apertures 18 in 20, viewing member 22 and solid transparent material viewing channel 204 may also be disposed such that the visually aligned relation thereof may also include a substantially coaxial alignment thereof.

Figure 7:
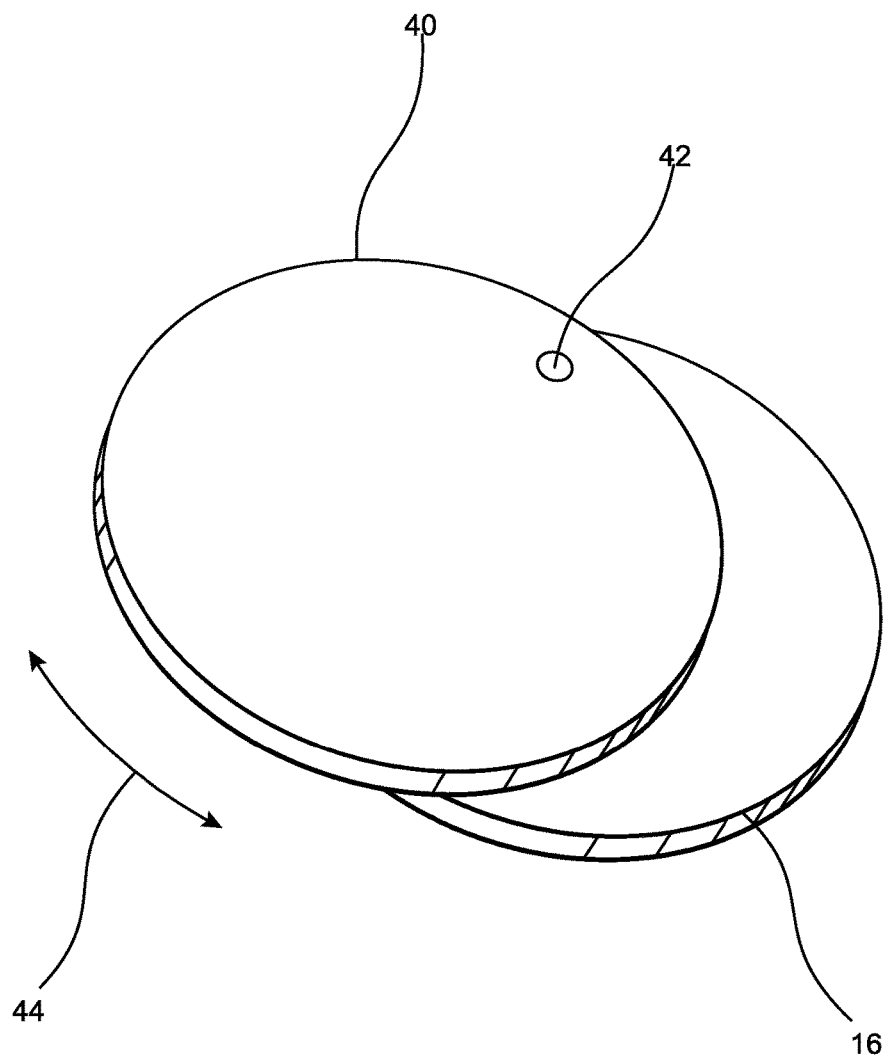
FIG. 7 is a front perspective view of the components of the embodiments of FIGS. 5 and 6 in an at least partially assembled orientation.

With primary reference to FIGS. 5-7, another structural and operative feature of the viewing assembly 10 includes a cover 40 movably connected in overlying, covering relation to the outer end 16. More specifically, a movable, pivotal and/or hinged connection 42, 42' may serve to attach the cover 40 to an exterior of the outer end 16 in a manner which facilitates the covering of the second viewing aperture 20. As schematically represented by the by directional arrow 44, the cover 40 may pivot, at least partially rotate and otherwise appropriately move relative to the outer end 16 so as to be selectively disposed into and out of covering relation to the second viewing aperture 20. Further, the connection 42, 42' may also be structured to normally dispose or bias the cover 40 into the covering relation to the second viewing aperture 20. As such an individual may physically or manually lift or otherwise position the cover 40, in accord with the directional arrow 44, so as to uncover the second viewing aperture 20 to facilitate viewing there through by an interior individual.

Figure 4:
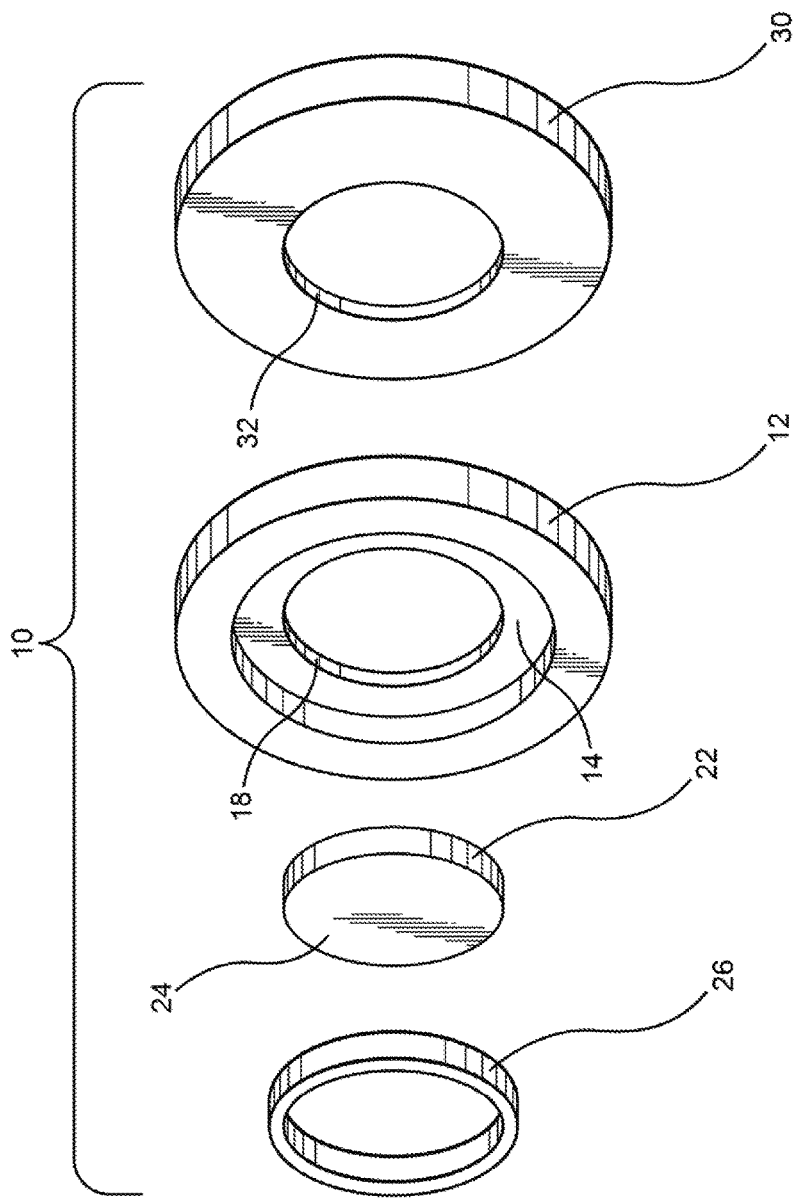
FIG. 4 is an exploded view of at least some of the structural components of the viewing assembly as represented in FIG. 3.

In addition to the above, one or more preferred embodiments of the viewing assembly 10 may also include an outer section generally indicated as 30 in an assembled, operative position of FIG. 3 and in detail in FIG. 4. When the completely assembled, viewing assembly 10 is in the operative position of FIG. 3 and the outer section 30 is adhered or otherwise appropriately secured to the outer surface 201 of the glass or other transparent material door or panel 202. Moreover, the outer section 30 includes a third viewing aperture 32, which is disposed in visually aligned relation with the first and second viewing apertures 18 and 20, the viewing member 22 and the transparent, solid material viewing channel 204. Therefore, when used in combination with the housing 10, the first, second and third viewing channels 18, 22 and 32 respectively are disposed in visually aligned relation with one another and with the viewing member 22 and the solid material viewing channel 204. The line-of-sight 300 is then defined by extending through the housing 10, the second viewing aperture 20, the viewing member 22, the first viewing aperture 18, solid transparent material viewing channel 204 and the third viewing aperture 32, all of which are visually aligned and extending successively along the line-of-sight 300.

Further, when the housing 12 and outer section 30 are used in combination, the inner end 14 may be secured to the interior surface 200 by an appropriate adhesive. In order to maintain the aesthetic appearance of the viewing device 10 and the housing 12, the outer section 30 is disposed in visually covering relation to the inner end 14 as represented in FIG. 3. As a result, a potentially unattractive presence of any adhesive material used to adhere the housing 12 to the exterior surface 200 of the glass doors 202, may not be easily observed. Even though one or more preferred embodiments of the viewing assembly 10 may comprise the housing 12 and the outer section 30 being used in combination with one another, it is emphasized that the housing 12 may be used by itself independently of the outer section 30.

As set forth above, the present invention also contemplates treatment, processing or structuring of the glass or other material door or panel 202 to include an obstructed viewing through portions thereof other than the solid transparent material viewing panel 204. Such obstructed viewing provides for increased security and privacy of individuals located on the interior side of the transparent door or panel 202. However, such a preferred treatment, processing, structuring, etc. is accomplished in a manner which maintains a clear, transparent, see-through portion of the glass door or panel structure, which is described herein as the aforementioned solid but transparent material "viewing channel" 204.

However, the present invention also contemplates treatment, processing or structuring of the panel or door 202 to include at least one obstructed surface 200. As a result, an "obstructed viewing" through remaining portions of the glass or other transparent material door 202 is established and maintained. Such obstructed viewing provides for increased security and privacy of individuals located on the interior side of the transparent door or panel 202. However, such a preferred treatment, processing, structuring, etc. is accomplished in a manner which is distinguishable from the prior art at least by maintaining a clear, transparent, see-through portion of the glass door or panel structure 202, which is described herein as the aforementioned solid but transparent material "viewing channel" 204.

Figure 8:
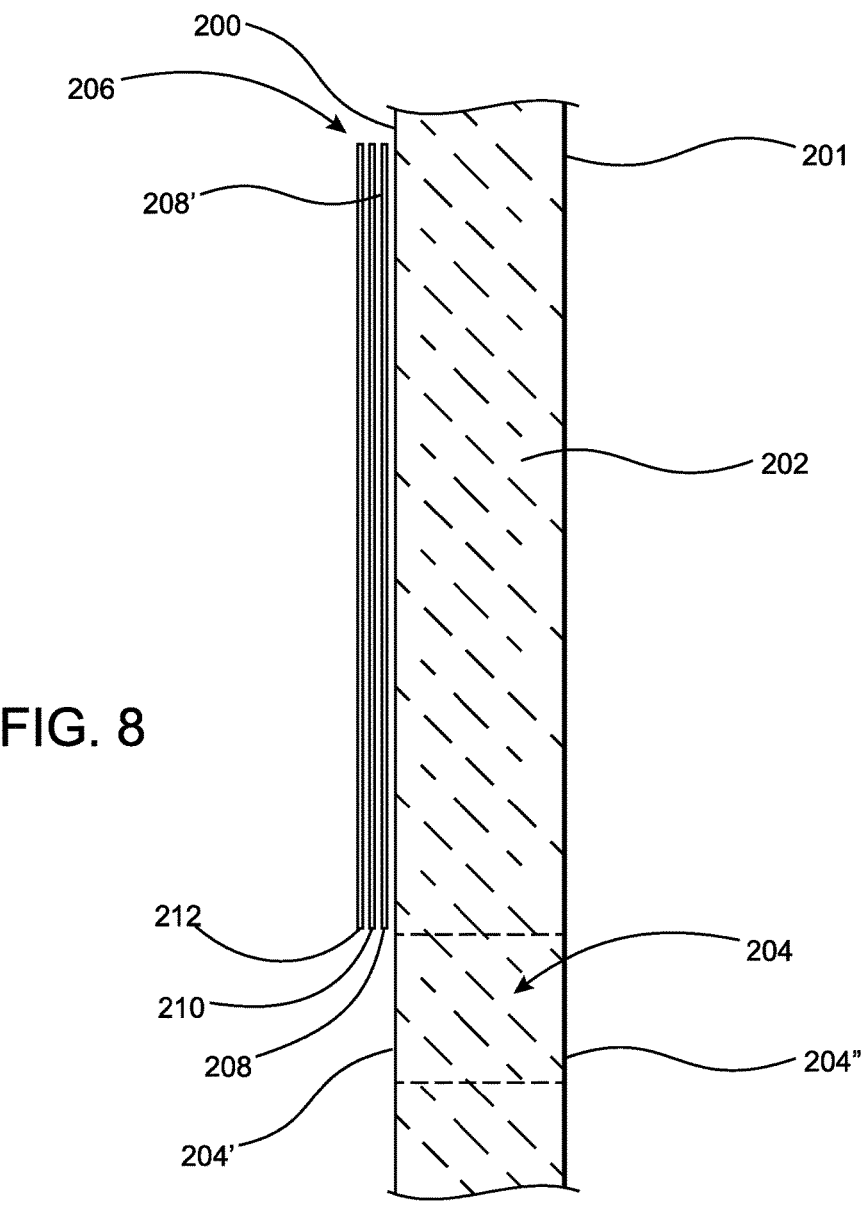
FIG. 8 is a detailed sectional view in cutaway of the embodiment of FIG. 3.

Therefore, as represented in FIGS. 3 and 8 one additional embodiment of the present invention comprises at least one surface 200 of the glass or other material door or panel 202 including at least one laminate 206 having at least one laminate sheet or film 208 which may initially be transparent. In addition, the laminate sheet 208 includes at least one or a plurality of "layers" 210, 212, etc. As such, each of the one or more layers 210, 212, etc. include and may be defined by printing, preferably digital printing, including "mat ink" and/or "clear ink" having icons, indicia, or other included decorative features, coloring, etc. or a combination thereof. Also, the utilization of at least one, but in additional embodiments multiple or a plurality of "printed layers" 210, 212, etc. on the at least one laminate sheet or film 208 may serve to provide a textured surface of the glass or other transparent material door or panel 202b. In more specific terms, when multiple printed layers 210, 212, etc. are formed on the laminate sheet 208, the aforementioned textured surface may be accomplished by forming the printed layers 210, 212, etc. successively, on top of one another. The resulting textured surface and/or multiple, successively printed, overlying layers 210, 212, etc. may further enhance the attractive, decorative features of the door panel 202b and may also provide additional obstructed viewing features which prevents or restricts clear viewing through the transparent material door panel 202. Therefore, as used herein the term "obstructed viewing" is meant to include a processing of one or more surfaces, as at 200, of the glass or like material door or panel 202 in a manner which eliminates or significantly restricts visual observation there through specifically, but not exclusively, from an exterior of the initially transparent door or panel 202 to the interior thereof. Further, such obstructed viewing may include sufficient treatment or processing of the single or multiple printed layer laminate sheet 208 to render one or more of the surfaces 200 opaque, thereby completely preventing viewing there through. In the alternative, the one or more laminate sheets 208 may be treated, processed, etc. to provide a translucent, as versus a transparent, quality to the glass or like transparent material door, panel, 202. Further, such processing done to provide an obstructed viewing through the door, panel, 202 is specifically absent in the area of the solid, transparent material viewing channel 204. As such, the opposite surfaces 204' and 204" at the opposite ends of the transparent material viewing channel 204 are also left uncovered by the laminate 206 including the at least one laminate sheet 208 and single or multilevel printing layers 210, 212, etc.

It is also emphasized that one or more embodiments of the present invention include the "obstructed viewing" being defined by the single laminate sheet 208 having at least one but possibly multiple printed layers 210, 212, etc. applied to at least one surface 200 thereof. However, in the alternative a plurality of individual laminate sheets (not shown for purposes of clarity) may be disposed in at least partially overlying relation to one another to form the textured and/or translucent and/or substantially opaque "obstructed viewing" through the at least one surface 200 of the glass or other transparent material door or panel structure 202, except in the area 204' and 204" of the solid, transparent material viewing channel 204.

It is also emphasized that FIG. 8 is a schematic representation and as such the at least one laminate sheet 208 is disclosed as being in spaced relation to the corresponding surface 200 of the glass or transparent material door 202. Similarly, for purposes of clarity, the one or more printed layers 210, 212, etc. are schematically represented in spaced relation from the single laminate sheet 208. However, as should be apparent and as generally indicated in FIG. 3, laminate 206 includes the at least one laminate sheet 208 being in confronting engagement and in overlying relation to the surface 200 and the one or more plurality of printed layers 210, 212, etc. in direct confronting relation to one another and the correspondingly disposed surface 208' of the at least one laminate sheet 208.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. An assembly structured for viewing through a solid material viewing channel integrally formed in a panel, said assembly comprising:
    a housing disposed in an operative position on the panel and including an inner end having at least a first viewing aperture form thereon,
    the panel being formed of a transparent material,
    a viewing member disposed on said housing in at least partially covering relation to said first viewing aperture,
    said viewing member structured for restricted viewing there through,
    said operative position comprising said first viewing aperture and said viewing member collectively disposed in aligned relation with a predetermined line-of-sight, and
    said predetermined line-of-sight extending concurrently through said housing, said viewing member, said first viewing aperture and the solid material viewing channel, to an exterior of the panel.

2. The assembly as recited in claim 1 wherein said operative position includes said inner end of said housing disposed on an interior surface of the panel and said first viewing aperture disposed in visually aligned relation with the solid material.

3. The assembly as recited in claim 1 wherein said restricted viewing of said viewing member comprises said viewing member structured for unidirectional viewing there through, along said line-of-sight.

4. The assembly as recited in claim 3 wherein said viewing member comprises a one way mirror oriented to facilitate said restricted, unidirectional viewing through said solid viewing channel and along said line-of-sight from an interior side to an exterior side of the panel.

5. The assembly as recited in claim 1 wherein said viewing member comprises a one-way mirror oriented to facilitate said restricted, unidirectional viewing along said line-of-sight from an interior side to an exterior side of the panel.

6. The assembly as recited in claim 1 wherein said housing includes an outer end disposed in spaced, substantially opposing relation to said inner end, at least a second viewing aperture formed in said outer end.

7. The assembly as recited in claim 6 wherein said first and second viewing apertures and said viewing member are collectively and visually aligned with and extend along said predetermined line-of-sight.

8. The assembly as recited in claim 7 wherein said first and second viewing apertures, said viewing member and the solid material viewing channel are collectively disposed in coaxial relation to said line-of-sight.

9. The assembly as recited in claim 6 wherein said housing comprises an at least partially hollow interior disposed between said inner end and said outer end, said viewing member disposed within said hollow interior adjacent said inner end.

10. The assembly as recited in claim 9 further comprising a retaining structure disposed within said hollow interior, in retaining relation to said viewing member.

11. The assembly as recited in claim 6 further comprising a cover formed of a non-transparent material and movably connected to said housing, said cover disposable into and out of covering relation to said second viewing aperture.

12. The assembly as recited in claim 6 further comprising an outer section operatively disposed on an exterior surface of the panel; said outer section including a third viewing aperture disposed along said line of site in aligned relation with said first and second viewing apertures.

13. The assembly as recited in claim 12 wherein said outer section is disposed in visually covering relation to said inner end of said housing.

14. The assembly as recited in claim 13 wherein said housing and said outer section are each disposed exteriorly of and in non-penetrating relation to the panel and the solid material viewing channel integrally formed in the panel.

15. The assembly as recited in claim 1 further comprising a laminate applied to at least one surface of the panel other than in the area of the solid material viewing channel.

16. An assembly structured for viewing through a solid, transparent material viewing channel integrally formed in a panel, said assembly comprising:
   a housing including an inner end disposed in an operative position adjacent an interior surface of the panel,
   said inner end including a first viewing aperture disposed in visually aligned relation with the solid material viewing channel,
   a viewing member disposed on said housing in visually aligned relation with said first viewing aperture and the solid material viewing channel,
   the panel being formed of a transparent material and including at least one obstructed surface, the obstructed surface having at least a portion that has been maintained as transparent,
   the solid material viewing channel being formed of the portion of the panel that has been maintained as transparent,
   said viewing member structured for restricted, unidirectional viewing there through,
   said housing including an outer end having a second viewing aperture formed therein,
   said operative position comprising said first and said second viewing apertures, said viewing member and the solid material viewing channel collectively oriented in visually aligned relation with and along a predetermined line-of-sight, and
   said housing, said viewing member, said first and said second viewing apertures disposed in aligned relation with the viewing channel.

17. The assembly as recited in claim 16 wherein said viewing member comprises a unidirectional, one-way mirror oriented to facilitate restricted viewing along said line-of-sight from an interior side to an exterior side of the viewing channel.

18. The assembly as recited in claim 16 further comprising an outer section operatively disposed on an exterior surface of the panel; said outer section including a third viewing aperture disposed along said predetermined line-of-sight in visually aligned relation with said second and said first viewing apertures.

19. The assembly as recited in claim 18 wherein said outer section is disposed in visually covering relation to said inner end of said housing.

20. An assembly structured for viewing through a transparent, solid material viewing channel integrally formed in a visually obscured, transparent material panel, said assembly comprising:
   a housing including an inner end and an outer end, said inner end adhered to an interior surface of the panel when in an operative position,
   said inner end and said outer end respectively including a first viewing aperture and a second viewing aperture each disposed in visually aligned relation with the transparent, solid material viewing channel and with one another,
   the transparent, solid material viewing channel being formed of the same material as the panel,
   a viewing member disposed on said housing in visually aligned relation with said first viewing aperture, said second viewing aperture and the transparent, solid material viewing channel,
   said viewing member structured for restricted, unidirectional viewing there through, and
   said operative position comprising said first and second viewing apertures, said viewing member and the transparent, solid material viewing channel collectively oriented in visually aligned relation with one another along a predetermined line-of-sight.

21. The assembly as recited in claim 20 wherein said viewing member comprises a one way mirror oriented to facilitate said restricted, unidirectional viewing along said predetermined line-of-sight from an interior side to an exterior side of the panel.

22. The assembly as recited in claim 21 wherein said housing comprises an at least partially hollow interior disposed between said inner and outer ends, said viewing member disposed within said hollow interior adjacent said inner end.

23. The assembly as recited in claim 22 further comprising a retaining structure disposed within said hollow interior in retaining relation to said viewing member.

24. The assembly as recited in claim 21 further comprising an outer section operatively disposed on an exterior surface of the panel; said outer section including a third viewing aperture disposed along said predetermined line-of-sight in successively visually aligned relation with said transparent, solid material viewing channel, said first viewing aperture, said viewing member and said second viewing aperture.

25. The assembly as recited in claim 24 wherein said housing and said outer section are each disposed exteriorly of and in non-penetrating relation to the panel and the transparent, solid material viewing channel formed therein.

26. The assembly as recited in claim 21 wherein said outer section is disposed in visually covering relation to said inner end of said housing.

* * * * *